United States Patent [19]

Bellavoine

[11] 4,198,555

[45] Apr. 15, 1980

[54] CABINET FOR STORING PREPARED MEALS ON INDIVIDUAL TRAYS

[75] Inventor: Robert Bellavoine, Pomlbieres-les-Bains, France

[73] Assignee: De Pruines Iseco S. A., Pomlbieres-les-Bains, France

[21] Appl. No.: 868,000

[22] Filed: Jan. 9, 1978

[51] Int. Cl.² .......................... H05B 9/00; H05K 7/20
[52] U.S. Cl. ...................... 219/10.55 R; 219/10.55 D; 219/395; 312/236; 126/21 R; 165/61
[58] Field of Search ................. 219/10.55 R, 10.55 A, 219/10.55 F, 10.55 M, 10.55 E, 10.55 D, 395, 400; 312/295, 236; 220/22; 126/20, 21; 99/451, 473

[56] References Cited

U.S. PATENT DOCUMENTS

| | | | |
|---|---|---|---|
| 2,919,336 | 12/1959 | Hahn | 219/10.55 R |
| 3,083,284 | 3/1963 | Kamide | 219/10.55 E |
| 3,428,772 | 2/1969 | Wallenfels | 219/10.55 F |
| 3,734,346 | 5/1973 | Yingst | 312/295 |
| 3,810,248 | 5/1974 | Risman et al. | 219/10.55 F |
| 3,908,749 | 9/1975 | Williams | 165/2 |
| 4,080,524 | 3/1978 | Greenfield, Jr. et al. | 219/10.55 E |

Primary Examiner—Bruce A. Reynolds
Assistant Examiner—Philip H. Leung
Attorney, Agent, or Firm—Pollock, Vande Sande & Priddy

[57] ABSTRACT

The invention relates to a cabinet or the like for storing and taking to a suitable temperature prepared meals carried on trays adapted to be introduced in a storage space in the cabinet which comprises at least one source of electromagnetic microwave radiation placed in a chamber, separated from the storage space, and individual metallic flaps placed at the level of each tray and comprising at least one movable part, for separating or placing in communication, at the level of the tray, the storage space and the chamber containing the microwave source, depending on whether the movable part of the flap is in a first or a second position. The invention is more particularly applied to the distribution of meals in hospitals.

12 Claims, 3 Drawing Figures

CABINET FOR STORING PREPARED MEALS ON INDIVIDUAL TRAYS

BACKGROUND OF THE INVENTION

The present invention relates to a piece of furniture for storing prepared meals carried on individual trays, which is adapted to receive a certain number of prepared trays for storing them between the moment of preparation thereof and the moment of distribution to those persons for whom they are intended.

More precisely, the piece of furniture according to the invention, which is either a fixed cabinet or a trolley, is also adapted to heat those dishes carried on the trays which are to be eaten hot.

SUMMARY OF THE PRIOR ART

The problem which the invention intends to solve is the taking on the stored trays to suitable temperature individually, without influencing the others, so that the reheating of one cooked dish does not involve the reheating of the dishes of the other stored trays.

Moreover, it is sought in certain cases to assure that all or part of the tray may remain stored at a low temperature, possibly a quick-freezing temperature of −18° C., as long as the order for reheating the cooked dish carried on this tray is not given. This cold-storage must preferably be selective, i.e. certain parts of the meal (appetizer, fruit, etc. . . . ) do not need to be quick-frozen, but need simply be kept cool, while the cooked dish to be reheated must often be quick-frozen for long-life conservation.

SUMMARY OF THE INVENTION

These requirements, as well as that of the selective reheating of the cooked dish alone, without reheating the other dishes on a tray, are necessary in certain applications such as the distribution of meals in hospitals or aircraft, and they may be satisfied by the present invention which proposes to this end a cabinet or the like for storing and heating to a suitable temperature articles placed therein, conventionally comprising a storage space provided with support means such as runners for receiving the trays, which are thus superposed on one another in one or more. The cabinet comprises at least one source of microwave radiation placed in a chamber, separated from the storage space, and individual metallic flaps placed at the level of each tray and comprising at least one movable part, for separating or placing in communication, at the level of this tray, the storage space and the chamber containing the microwave source, depending on whether the movable part of the flap is in a first position or a second position.

The individual flaps are superposed on one another and are contiguous when they are in their first position, so as to assure a total insulation with respect to the microwaves (which are reflected by the metallic faces of the flaps) between the storage space and the chamber containing the microwave source.

On the contrary, if one of the flaps is open, the microwaves may pass towards the tray to be taken to a suitable temperature. These waves may be directed selectively towards one dish of the tray only by providing the tray with a metallic compartment containing the dish to be heated, coming opposite a flap and assuring a microwave-tight seal with respect to the rest of the storage space (i.e. the opening of a flap allows microwaves to penetrate only into this compartment, the contents of which are thus reheated selectively).

The flaps must be composed of metallic materials so as to stop the microwave radiation, but they may be made, for example, of galvanized plastic material, a metal-coated material, or the like. The term "metallic flap" is intended to comprise such materials.

Furthermore, according to another feature of the invention, with a view to assuring the cold-conservation of the prepared dishes before they are taken to a suitable temperature, the spaces for storing the trays are provided with shafts for the circulation of coolant air installed along the stacks of trays and comprising openings at the level of each tray. These openings are positioned in such a manner that they may be obturated by the individual movable flaps when said latter are in their first position. However it is further provided that the flaps may take a third intermediate position in which, while continuing the seal with respect to the microwaves between the space and the chamber containing the microwave source, they no longer obturate the openings through which coolant air may pass.

A storage cabinet is thus provided which is capable of maintaining the trays which it contains cold, then of heating them to the desired temperature. These two situations are determined by the degree of insertion of each tray, without affecting the others.

DESCRIPTION OF THE PREFERRED EMBODIMENT

Figure 2:
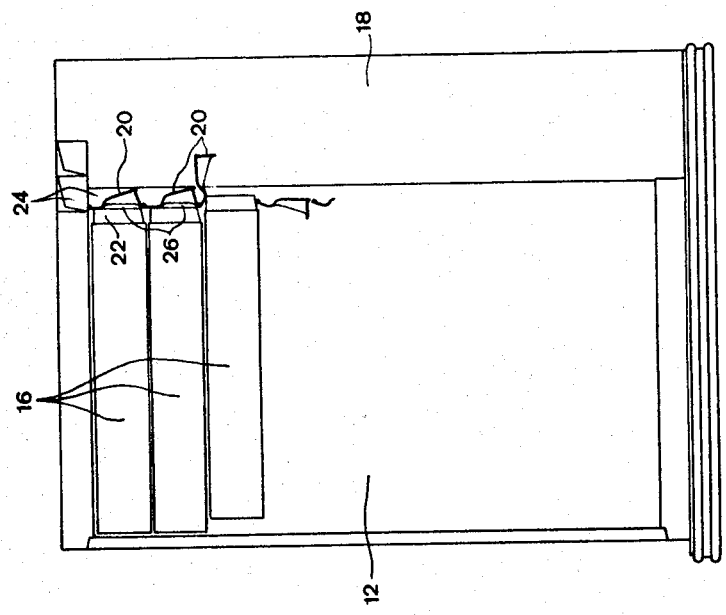
FIG. 2 shows a lateral section of the storage cabinet of FIG. 1.
Figure 1:
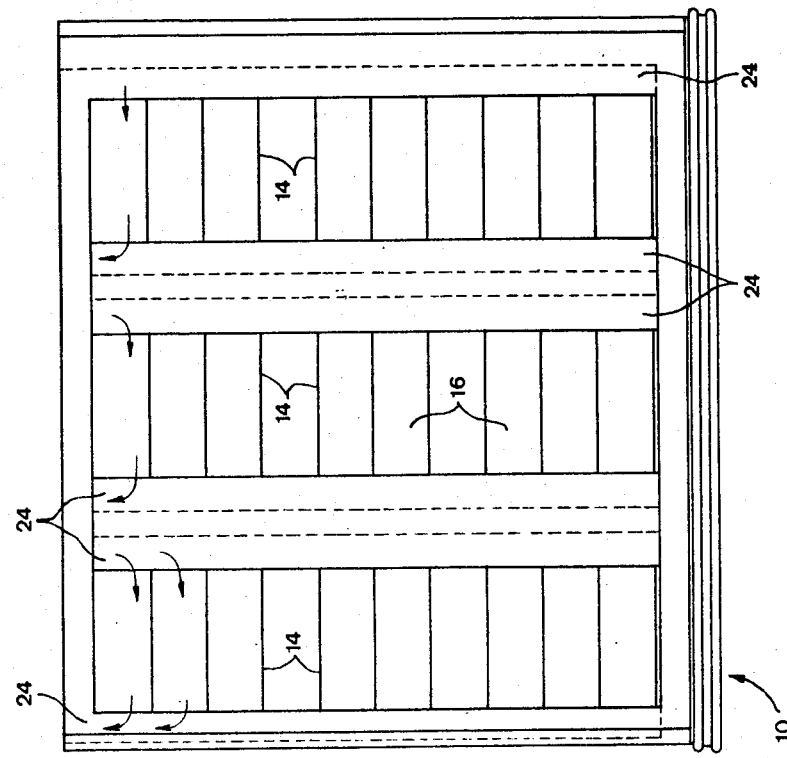
FIG. 1 shows a general front view of a storage cabinet according to the invention.

Referring now to the drawings, FIGS. 1 and 2 schematically show a storage cabinet 10 which is assumed to be fixed but which may be in the form of a trolley on wheels.

This cabinet conventionally comprises, in a storage space 12 at the front of the cupboard, support runners 14 regularly spaced apart and allowing trays to be introduced in stacks, said trays carrying individual prepared meals which are thus stored between the moment of preparation thereof and the moment of distribution to the consumers.

The cabinet contains, for example, three stacks of about ten trays 16. It is provided with air-tight doors since it is intended to maintain the prepared dishes cold, then to reheat some of them; it is necessary in both cases to avoid leakage of heat.

According to the invention, cabinet 10 comprises, behind the storage space 12, a chamber 18 containing at least one source of electromagnetic microwave radiation (not shown) serving to reheat the stored trays.

The storage space 12 is separated from the chamber 18 containing the microwave source by a series of individual flaps 20, placed at the level of each tray and serving either to place in communication or to separate the space 12 and chamber 18 at the level of said tray.

The flaps 20 are metallic and contiguous when they separate the space from the chamber, so as to produce a total insulation with respect to the microwave radiation between said space and said chamber. The microwaves are in fact reflected by the metallic parts.

These flaps are movable or comprise a movable part to assure the communication of the space and chamber at the level of a pre-determined tray and thus reheat all or part of this tray. In the present case, the flaps are movable as a whole; they are constituted by a plate element stamped or cast in a particular shape which will be specified hereinafter. Their length corresponds to the width of the end of the trays which comes opposite these flaps and their width corresponds to the pitch in height of the runners 14 serving for the stacking of the trays.

The flaps are mounted to rotate about an axis in their upper part and may take at least two positions, a first rest position in which their lower edge comes into contact with the flap underneath to prevent the penetration of microwaves at the level of the first flap, and a second heating position in which the flap is open and creates a communication for the microwaves towards the tray to be reheated which is located at the level of this flap.

If the whole of the tray is to be reheated, means are provided to insulate the trays from one another with respect to the microwaves. For example, the individual trays 16 are provided at their end with an open metallic compartment 22 which comes into contact with the metallic flap located at its level so as to assure that, when a flap is open, the microwaves are directed towards the metallic compartment and are confined therein. This arrangement will be described in greater detail with reference to FIG. 3.

It is the trays themselves which push the flaps located at their level, i.e. if the tray is pushed sufficiently in, it triggers off its own reheating. On the other hand, in the absence of a tray or if the tray is not fully pushed in, the flaps remain contiguous and space 12 and chamber 18 remain separated at the level of this tray.

Each flap is to this end returned into its first position, i.e. its normal position impervious with respect to the microwaves in which it is contiguous with the flaps which are above and beneath it (assuming that they too are in a microwave-impervious position).

The flaps are, in the present case, arranged so that they return into this first position by gravity.

Furthermore, the storage space 12 in the cabinet is provided with vertical shafts 24 for the circulation of coolant air, which extend along the stacks of trays and which are supplied with cold air, e.g. from +3° C. to −20° C. (quick-freeze temperature).

These shafts 24 are provided with holes 26 at the level of each individual plate, and at such a spot as to be able to be obstruction by the flap at the level of this tray, at least when said flap is in the rest position to which it normally returns by gravity in the absence of a tray. The flap is thus shaped so as to be able to effect this obstruction which, moreover, does not need to be absolutely tight, as will be explained hereinafter.

Figure 3:
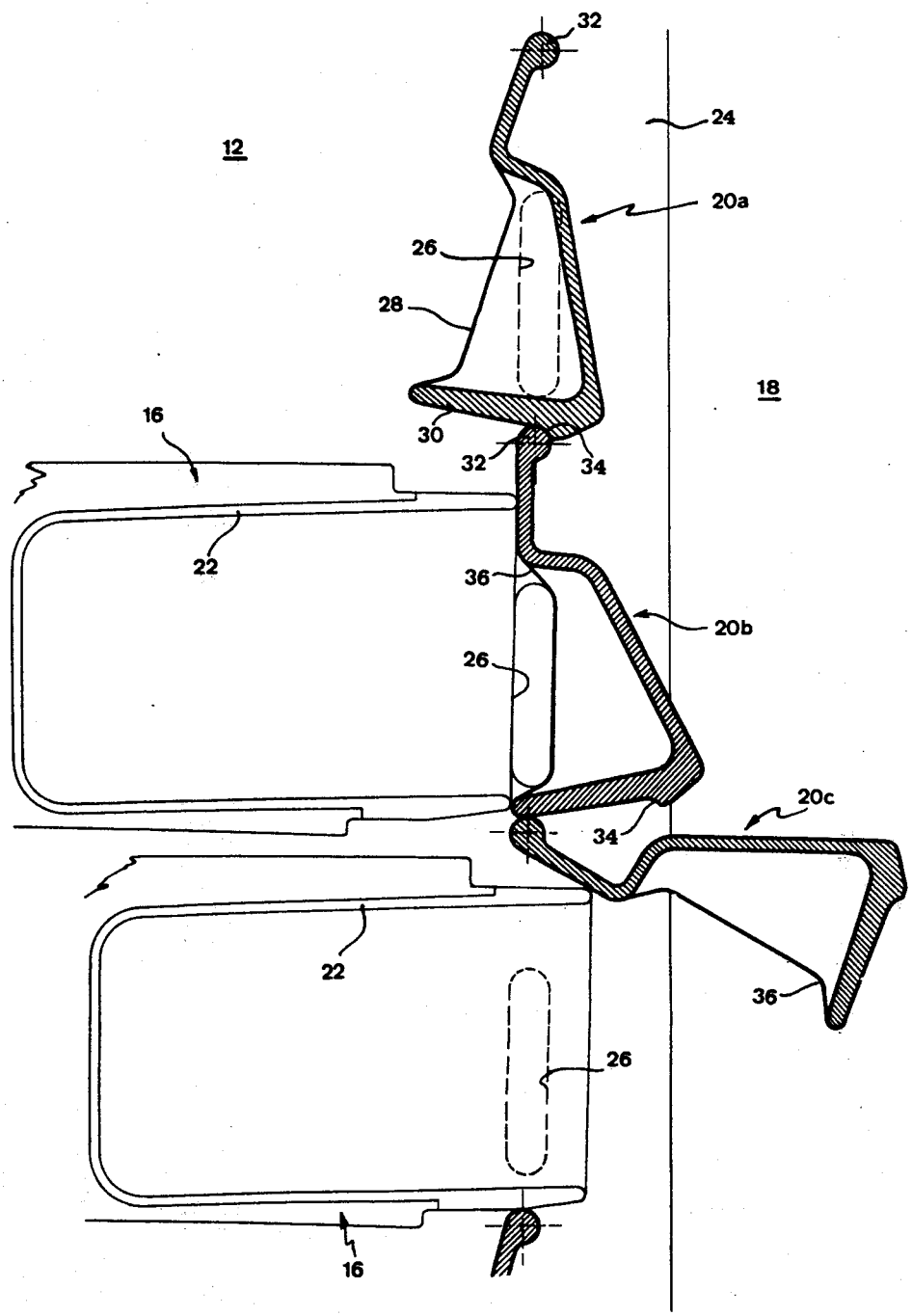
FIG. 3 shows in detail the superposed individual flaps, in section.

The shafts 24 as well as the flaps 20 are shown in greater detail in FIG. 3 which shows three superposed flaps in lateral section, in three different positions which they may occupy when the storage cabinet is being used.

The first flap 20a is shown in its first position, to which it returns by force of gravity in the absence of a tray at its level.

In this rest position, its vertical lateral walls 28 obstruct the openings 26 in front of which it comes naturally into position.

In this first position, its lower wall 30 comes into contact with a cylindrical part 32 of the flap 20b underneath, concentric with the axis about which the flap is mounted. A shoulder 34 of circular section at the bottom of the flaps maintains this contact by abutting, under the effect of gravity, against the cylindrical part 32.

Due to this cylindrical part 32 around which the flap rotates in its pivoting movement between its different positions, the contact between flap 20a and flap 20b remains contiguous whatever the position of flap 20b. However, other means may be provided to assure this contact whatever the position of the flap underneath. For example, for each flap, a fixed element may be provided in its upper part, or the upper and lower edges of the flaps may be so arranged that the lower flap remains in contact with the upper flap.

In their second position, the one which flap 20c occupies in FIG. 3, and into which they are pushed when a tray 16 is completely inserted in the storage space, the flaps are sufficiently open to allow the microwaves from chamber 18 to communicate with the storage space 12, at the level of the tray corresponding to this flap.

In the preferred application of the invention, the whole of the tray in question has not been heated by the microwaves, but only one cooked dish. This dish is previously placed in a metallic compartment 22 formed at the end of each tray. This compartment 22 is open on the side facing the flap 20 at the back of the storage space and the microwaves are directed through the opening of flap 20c towards said compartment and are confined therein.

The metallic walls of the compartment prevent the waves from being directed elsewhere in the rest of the storage space 12. To this end, the end edge of the compartment is arranged to remain contiguous on the whole of its periphery with the flaps 20 (in practice, it remains contiguous in its upper part with the flap at the level of the tray and in its lower part with the flap underneath). This condition is essential for the reheating of the cooked dish to be selective.

The height of the metallic compartment is slightly smaller than the pitch of the support runners for the trays. Its width is the same as that of the movable parts of the flaps so that the desired seal is effected, and this width is equal to the gap between the cold air shafts.

In the embodiment here described, the vertical side walls of the compartment project from the tray and obstruct the openings 26 of the cold air shafts. These side walls are located in the same plane as the side walls of the flaps to perform the same function of obturation of the cold air openings. Other arrangements may be provided in which the flap 20 is constituted by two parts having side walls which successively obstruct said openings, either when the flap is in its first position or when it is in its second position.

In any case, these openings must be obstructed when the tray is to be reheated without allowing the cold air to escape, when a circulation of cold air is provided.

Trays will preferably be used such as those described in applicant's co-pending application entitled "Individual prepared meal tray".

Finally, the flaps may take a third intermediate position, that of flap 20b of FIG. 3, provided for cold-storage of the tray, and particularly the cooked dish placed in the metallic compartment 22.

In this position, in which the flap 20b is pushed by a tray which has not been completely inserted to the back of the storage space, the seal with respect to the microwaves is assured as in the first position, and the flap 20b therefore remains in contact on all its sides with the metallic parts of the adjacent flaps or the shafts 24, but the flap is sufficiently pushed back to uncover the opening 26 which is at its level, thus enabling said opening to be placed in communication with the storage space.

The cold air may therefore circulate, particularly towards the cooked dish contained in compartment 22, which dish may thus be kept frozen at $-18°$ C. as is desirable.

The rest of the tray does not need to be quick-frozen any more than the adjacent trays, and it is arranged that the uncovered opening 26 is placed in communication only with the interior of compartment 22, as shown in FIG. 3 (flap 20b). To this end, the flap is provided in its side wall with a notch 36 which uncovers this opening when the compartment comes into contact with the flap and pushes it into its third position. The notch could also be an opening in the flap, or an opening or notch in the compartment 22 in the tray itself.

It will be noted that the seal against the circulation of the cold air outside the compartment 22 in this third position is not perfect, since there are more or less good metallic contacts between the walls.

However, this imperfect seal is not a hindrance; on the contrary, it helps to maintain a cooled atmosphere in the whole of the storage space 12, where dishes such as appetizers, cold desserts, etc. are placed. It is quite appropriate to maintain these at about $7°$ C. with the air of the leakage of cold air.

It will be noted that the chamber containing the microwave source may be mechanically separated from the storage space, in which case means for coupling the two are provided.

What is claimed is:

1. Cabinet for storing and heating to a suitable temperature prepared meals carried on trays adapted to be introduced in a storage space in said cabinet, support means being provided to support said trays in superposed locations in said storage space, said cabinet comprising
   (a) at least one source of electromagnetic microwave radiation located in a chamber separated from said storage space; and
   (b) individual metallic flaps each corresponding to one tray and comprising at least one movable part, said flaps being movable between first and second position for selectively separating and placing in communication said chamber and said storage space, means being provided for insulating from each other, with respect to microwave propagation, respective portions of said storage space corresponding to each flap, whereby, when the movable part of a flap is in its second position, the corresponding portion of said storage space is in communication with said chamber independently of the other portions.

2. A cabinet according to claim 1, wherein the individual flaps are superposed on one another and are contiguous when they are in said first position, so as to assure total insulation with respect to microwave propagation between said storage space and said chamber.

3. A cabinet according to claim 2, intended for storing trays provided with an open metallic compartment for assuring the reheating of dishes contained in said compartment by the communication of the opening of said compartment with said chamber, wherein said flaps are arranged to cooperate with said compartment so as to contact its wall, preventing any penetration of microwaves into said storage space outside said compartment when the flap at the level of the corresponding tray is in said second position in which said compartment communicates with said chamber.

4. A cabinet according to claim 3, wherein the insulation with respect to microwave propagation outside said compartment of a tray placed in said storage space is assured in the upper part of said compartment by the flap located at the level of such tray and in contact with such compartment, and in the lower part of said compartment by the flap located at the level below the level of said tray.

5. Cabinet according to claim 1, wherein the movable part of each flap is mounted to pivot on an axis located in its upper part, so as to be biased towards its first position, and may be pushed into its second position by the introduction of a tray to be heated to a suitable temperature into the storage space at the level of such flap.

6. Cabinet according to claim 5, wherein the movable parts of said flaps are so arranged as to return to their said first position by force of gravity.

7. Cabinet according to claim 1, comprising shafts for the circulation of coolant air in said storage space along the stacks of trays, said shafts having openings at the level of each tray, said movable part of each said flap being movable between
   (a) said first, rest position, in which no tray has been placed in said storage space at the level of such flap, and in which said flap obstructs said coolant air opening located at its level and, at the level of the tray in question, insulates said storage space from said chamber with respect to said microwaves;
   (b) said second, heating position in which said flap no longer insulates said storage space from said chamber; and
   (c) a third, intermediate position for cold storage, in which the flap no longer obstructs said openings at the level of the corresponding tray but in which it insulates, with respect to said microwaves, said storage space from said chamber at the level of the tray.

8. Cabinet according to claim 7, wherein each flap is so arranged as to remain in contact with the flap located above or below it in both said first and third positions, such contact providing a seal against microwave propagation.

9. Cabinet according to claim 7, wherein each said flap comprises an upper cylindrical portion whose axis merges with the axis of rotation of the movable part of said flap, said cylindrical portion remaining at the same location whatever the position of said flap, each said flap further comprising a lower wall portion shaped so as to remain in microwave sealing propagation with the cylindrical portion of the flap located thereneath when said first flap moves between its first and its third positions.

10. Cabinet according to claim 7, wherein said storage space is so arranged that the openings in said coolant air shafts may be obstructed when said movable flap is maintained in its said second position.

11. Cabinet according to claim 7, wherein said movable part of a flap is arranged to be selectively moved into its second and third positions dependent on the degree of insertion of a tray in said storage space at the level of said flap.

12. Cabinet according to claim 7, wherein said openings in said shafts are so located as to be obstructed by the tray when it is inserted sufficiently to move the corresponding flap into its said second position but not to be obstructed when it is inserted to a position resulting in movement of the corresponding flap to its said third position.

* * * * *